United States Patent
Glaister et al.

(10) Patent No.: US 9,529,575 B2
(45) Date of Patent: Dec. 27, 2016

(54) RASTERIZATION OF COMPUTE SHADERS

(75) Inventors: Andy Glaister, Redmond, WA (US); Blaise Pascal Tine, Lynnwood, WA (US); Derek Sessions, Bellevue, WA (US); Mikhail Lyapunov, Woodinville, WA (US); Yuri Dotsenko, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 851 days.

(21) Appl. No.: 13/398,798

(22) Filed: Feb. 16, 2012

(65) Prior Publication Data

US 2013/0215117 A1 Aug. 22, 2013

(51) Int. Cl.
*G06T 15/80* (2011.01)
*G06F 9/45* (2006.01)

(52) U.S. Cl.
CPC .................... *G06F 8/456* (2013.01)

(58) Field of Classification Search
CPC .............. G06T 1/20; G06T 1/60; G06F 8/456; G06F 8/433; G06F 9/45525; G06F 8/36; G06F 8/41; G06F 8/453; G06F 8/458; G06F 9/3851; G06F 9/3877; G06F 9/4443; G06F 9/4881; G06F 11/3612; G06F 11/3624; G06F 17/10; G06F 17/142
USPC ........................................................ 345/426
See application file for complete search history.

(56) References Cited

U.S. PATENT DOCUMENTS 7,603,664 B2 * 10/2009 Dutt et al. .................... 717/153
2006/0005178 A1 1/2006 Kilgard et al.
2009/0113402 A1 4/2009 Chen et al.
2009/0259997 A1 * 10/2009 Grover et al. ................. 717/136
2011/0050713 A1 3/2011 McCrary et al.

(Continued)

FOREIGN PATENT DOCUMENTS

CN 101556543 A 10/2009
CN 102132249 A 7/2011

(Continued)

OTHER PUBLICATIONS

Horn, et al., "Interactive k-D Tree GPU Raytracing", Retrieved at <<http://graphics.stanford.edu/papers/i3dkdtree/gpu-kd-i3d.pdf>>, Proceedings of the 2007 symposium on Interactive 3D graphics and games, Apr. 29-May 2, 2007, pp. 167-174.

(Continued)

*Primary Examiner* — Sultana M Zalalee
(74) *Attorney, Agent, or Firm* — Sunah Lee; Dan Choi; Micky Minhas

(57) ABSTRACT

Described are compiler algorithms that partition a compute shader program into maximal-size regions, called thread-loops. The algorithms may remove original barrier-based synchronization yet the thus-transformed shader program remains semantically equivalent to the original shader program (i.e., the transformed shader program is correct). Moreover, the transformed shader program is amenable to optimization via existing compiler technology, and can be executed efficiently by CPU thread(s). A Dispatch call can be load-balanced on a CPU by assigning single or multiple CPU threads to execute thread blocks. In addition, the number of concurrently executing thread blocks do not overload the CPU.

14 Claims, 6 Drawing Sheets

(56) References Cited

U.S. PATENT DOCUMENTS

2011/0050716 A1 3/2011 Mantor et al.
2011/0161944 A1 6/2011 Cho et al.

FOREIGN PATENT DOCUMENTS

| GB | 2459022 A | 10/2009 |
|---|---|---|
| JP | 2000-507373 A | 6/2000 |
| KR | 10-2010-0081347 A | 7/2010 |

OTHER PUBLICATIONS

Chan, et al., "Efficient Partitioning of Fragment Shaders for Multipass Rendering on Programmable Graphics Hardware", Retrieved at <<http://people.csail.mit.edu/ericchan/papers/rds/rds.pdf>>, Proceedings of the ACM SIGGRAPH/Eurographics conference on Graphics hardware, Sep. 2-3, 2002, pp. 69-78.

Horowitz, Mark., "Smart Memory Systems: Polymorphous Computing Architectures", Retrieved at <<http://www.dtic.mil/cgi-bin/GetTRDoc?Location=U2&doc=GetTRDoc.pdf&AD=ADA428584>>, Technical Report, AFRL-VS-PS-TR-2004-1180, Aug. 31, 2004, pp. 47.

Woo, et al., "Compass: A Programmable Data Prefetcher Using Idle GPU Shaders", Retrieved at <<http://arch.ece.gatech.edu/pub/asplos15.pdf>>, ACM SIGPLAN Notices—ASPLOS '10, vol. 45, No. 3, Mar. 2010, pp. 297-310.

Chang, Yun-Nan., "An Efficient Hardware-Software Codesign of 3D Rasterization Module", Retrieved at <<http://ieeexplore.ieee.org/stamp/stamp.jsp?tp=&arnumber=6031840>>, IEEE International Conference on Consumer Electronics, Sep. 6-8, 2011, pp. 15-16.

Laine, et al., "High-Performance Software Rasterization on GPUs", Retrieved at <<http://www.tml.tkk.fi/~samuli/publications/laine2011hpg_paper.pdf>>, Proceedings of the ACM SIGGRAPH Symposium on High Performance Graphics, Aug. 5-7, 2011, pp. 79-88.

"International Search Report", Mailed Date: May 9, 2013, Application No. PCT/US2013/026292, Filed date: Feb. 15, 2013, pp. 9.

"Supplementary Search Report Issued in European Patent Application No. 13748891.2", Mailed Date: Jan. 7, 2016, 14 Pages.

Guo, et al., "Correctly Treating Synchronizations in Compiling Fine-Grained SPMD-Threaded Programs for CPU", In Proceedings of the International Conference on Parallel Architectures and Compilation Techniques, Oct. 10, 2011, 10 Pages.

Stratton, et al., "Efficient Compilation of Fine-Grained SPMD-threaded Programs for Multicore CPUs", In Proceedings of the 8th Annual IEEE/ACM International Symposium on Code Generation and Optimization, Apr. 24, 2010, pp. 111-119.

Stratton, et al., "MCUDA: An Efficient Implementation of CUDA Kernels for Multi-core CPUs", In Book-Languages and Compilers for Parallel Computing, Lecture Notes in Computer Science, vol. 5335, Jul. 31, 2008, pp. 16-30.

Office Action Issued in Chinese Patent Application No. 201380009663.3, Mailed Date: Aug. 1, 2016, 11 Pages.

* cited by examiner

RASTERIZATION OF COMPUTE SHADERS

BACKGROUND

Recent trends indicate significant increase in the use of GPUs (graphics processing units) for general-purpose computing (GPGPU). That is, GPUs are tending to be used for computing not necessarily related to computer graphics, such as physics simulation, video transcoding, and other data-parallel computing. Furthermore, the introduction of on-chip shared memory in GPUs has led to marked performance improvements for widely-used compute-intensive algorithms such as all-prefix sum (scan), histogram computation, convolution, Fast Fourier Transform (FFT), physics simulations, and more. Microsoft Corporation offers the Direct X™ HLSL (High Level Shading Language)™ Compute Shader as a software API (application programming interface) to access and utilize shared memory capabilities. Note that Direct X, the HLSL, and Compute Shader will be referred to as examples, with the understanding that comments and discussion directed thereto are equally applicable to other shading languages such as CUDA (Compute Unified Device Architecture), OpenCL (Open Compute Language), etc. These will be referred to generically as "compute shaders".

A complete software platform should provide efficient software rasterization of a compute shader (or the like) on CPUs to provide a fallback when GPU hardware is not an option, or when the software platform is used in a headless VM (Virtual Machine) scenario, without the need to implement both GPU and CPU hardware solutions. That is, it is sometimes desirable to execute shader language code on a CPU rather than a GPU. However, mapping GPU-centric compute shaders onto CPUs efficiently is non-trivial primarily due to thread synchronization, which is enforced by thread barriers (or syncs).

While the efficiency of scalar shader code is important, discussion herein relates to efficiently mapping onto CPUs (as opposed to GPUs) the parallelism found in compute shaders. Compute shaders may expose parallelism in different ways. For example, the Direct Compute™ Dispatch call defines a grid of thread blocks to expose parallelism on a coarse level, which is trivial to map onto CPU threads. Each thread block is an instance of a compute shader program that is executed by multiple shader threads (a shader is analogous to a kernel in CUDA, for example). The shader threads of a block may share data via a shared memory that is common to threads in the block but private to the thread block. The threads of each thread block may be synchronized via barriers to enable accesses to shared memory without concern for data-race conditions arising. GPUs typically execute compute shaders via hardware thread-contexts, in groups of threads (warps or wave-fronts), and each context may legally execute the program until it encounters a barrier, at which point the context must wait for all other contexts to reach the same barrier. Hardware context switching in GPUs is fast and heavily pipelined. However, CPUs do not have such hardware support, which makes it difficult to efficiently execute compute shaders on CPUs.

Techniques discussed below relate to transforming a compute shader program into an equivalent CPU program that delivers acceptable performance on CPUs.

SUMMARY

The following summary is included only to introduce some concepts discussed in the Detailed Description below. This summary is not comprehensive and is not intended to delineate the scope of the claimed subject matter, which is set forth by the claims presented at the end.

Described herein are compiler algorithms that partition a compute shader program into maximal-size regions, called thread-loops. The algorithms may remove original barrier-based synchronization yet the thus-transformed shader program remains semantically equivalent to the original shader program (i.e., the transformed shader program is correct). Moreover, the transformed shader program is amenable to optimization via existing compiler technology, and can be executed efficiently by CPU thread(s). A Dispatch call can be load-balanced on a CPU by assigning single or multiple CPU threads to execute thread blocks. In addition, the number of concurrently executing thread blocks do not overload the CPU. Note that CPU thread(s) execute multiple thread blocks (instances of the compute shader program). The Dispatch call may specify the execution of millions of instances. If all of these thread blocks are launched together there may be problems such as overconsumption of memory, poor cache utilization, and frequent context switching.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
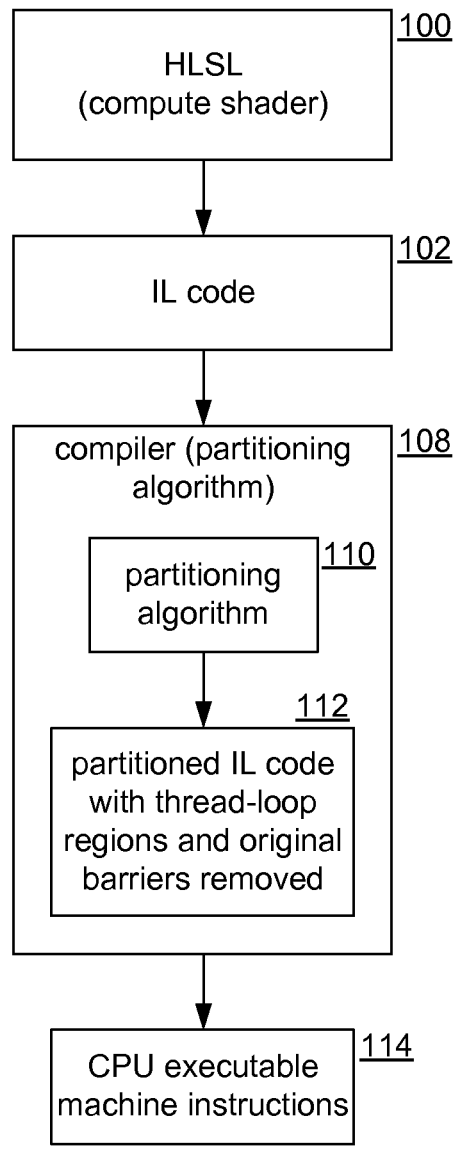
FIG. 1 shows a context for a compute shader partitioning algorithm.

There are several ways that a compute shader can be mapped onto a CPU. A naïve approach is to mimic the GPU model; i.e., interpret the original program in groups of threads and yield the execution upon encountering a barrier. However, with this approach performance can be poor due to the high overhead of context switching for a CPU. Alternatively, the shader can be partitioned at barriers, e.g.:

```
B1 // a code block that does not execute a barrier
barrier // all threads of a thread block must
   arrive here and only after that can
   proceed execution
B2 // another code block
``` is transformed into

```
for all threads do B1[t] // where B1 [t] is the code
   // block instance as
   // executed by thread t
for all threads do B2[t].
```

This technique is both correct and efficient. A thread loop (t-loop) is denoted as "for all threads do". As the name implies, a t-loop executes one iteration for each thread t of a thread block. To maintain the semantics of the original shader program, the original variables must be privatized; i.e., each thread uses its own set of variables, called t-loop variables. Among other ways, this may be achieved, for example, by making each variable v an array of size T, the number of threads in a thread block, so that thread t uses v[t] as its copy. Thus, the notation B[t], which indicates that the original code block B uses the variable set private to thread t. Note that not all variables should be replicated and some optimizations are possible. Moreover, while efficient scalar code generation is useful, discussion herein concerns mapping compute shader parallelism onto CPUs efficiently. Thus, a t-loop may also be referred to as a parallel for-all loop. As will be seen, iterations of a t-loop are independent and can legally be executed in any order by one or multiple CPU threads.

The approach above is straightforward for simple partitioning. However, if a barrier is nested within a control flow construct (e.g., an if-statement, switch statement, etc.), care must be taken to not break the scoping structure of the program. Since HLSL and other shading languages have well-defined scopes (Sub, If, Switch, and Loop), these may be readily optimized. To preserve scoping properties, each t-loop should be properly nested. Alternatively, an arbitrary go to might be needed, which would complicate the optimization significantly and might not be acceptable for just-in-time (JIT) compiling. Consider the following example:

```
B1
if(c1) // c1 is a variable
  B2
  barrier
  B3
endif
B4
``` which is transformed into

```
for all threads do B1[t]
if(c1[0])
  for all threads do B2[t]
  for all threads do B3[t]
endif
for all threads do B4[t]
```

Notice that any barrier must execute in uniform control flow (UCF) (all threads execute the statement). In other words, all threads of a thread block must reach the barrier in a correct program. Therefore, "if(c1)" in the example above must be a uniform transfer, and it is sufficient to check only one instance, e.g., c1 instance of thread 0—c1[0].

Algorithm for Insertion of T-Loops

FIG. 1 shows a context for a compute shader partitioning algorithm. Initially, shading language source code 100 such as a HLSL compute shader is compiled to produce intermediate language (IL) 102 code (i.e., intermediate representation (IR) code, bytecode, etc.) which may be intended for the parallelism of a GPU. Alternatively, the algorithm can be applied to source code directly. Per compiler options or other environment or configuration settings, compiler 108 invokes a partitioning algorithm 110 that transforms the IL code 102 producing partitioned IL code 112 with maximal-size regions (thread loops) and with barrier-based synchronization removed. The partitioned IL code 112 is then compiled and possibly optimized, as with any other IL, into CPU executable machine instructions 114 for execution in a CPU, which is not a GPU. The compiler 108 may be an online JIT compiler or it may be an offline compiler that produces a stored machine executable program.

Figure 2:
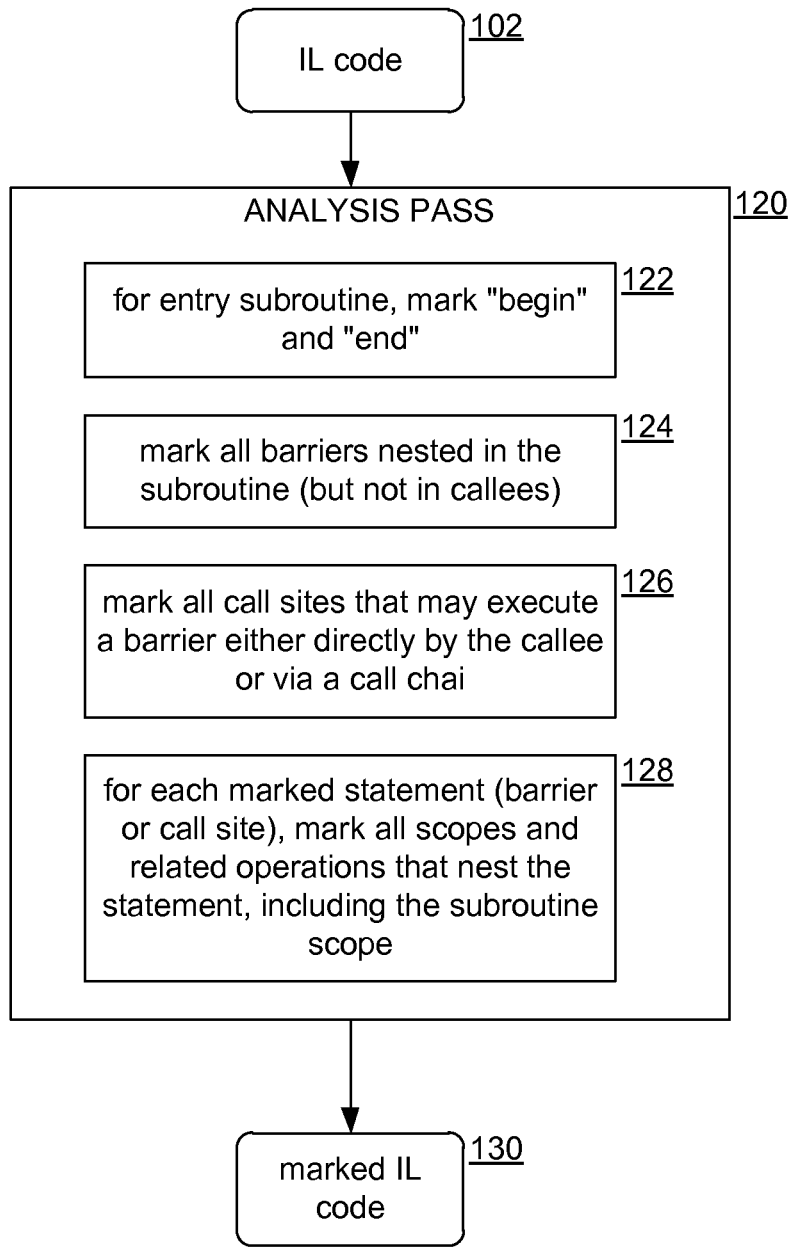
FIG. 2 shows an analysis pass of the partitioning algorithm.

FIG. 2 shows an analysis pass 120 of the partitioning algorithm 110. As will be explained, the analysis pass 120 marks code for partitioning and is applied to each IL operation in IL code 102. The entry subroutine (entry point of the shader program) and each subroutine that may execute a barrier itself or via a call chain can be partitioned as follows. At step 122, for the entry subroutine, the begin and end of subroutine operations are marked, which accommodates the case where the main subroutine does not have nested barriers. At step 124, barriers nested within the subroutine are marked, but not in callees (called subroutines). At step 126, callees that may execute a barrier are marked. At step 128, each barrier or the like is processed by marking all scopes that nest the barrier including the subroutine scope. Such marked operations may include both begin and end or scope operations as well as related IR operations such as OpElse for an if-statement, and OpSwitchCase and OpSwitchDefault for a switch statement. One embodiment may also verify that all nesting scopes execute in UCF and that their conditional expressions, if any, are uniform values (the same for each thread). Note that determining whether a subroutine may execute a barrier either directly or via a call site nested in the subroutine may be trivially computed by taking a transitive closure on a call graph The steps 124, 126, and 128 should be performed in the order shown in FIG. 2. The analysis pass outputs marked IL code 130.

Figure 3:
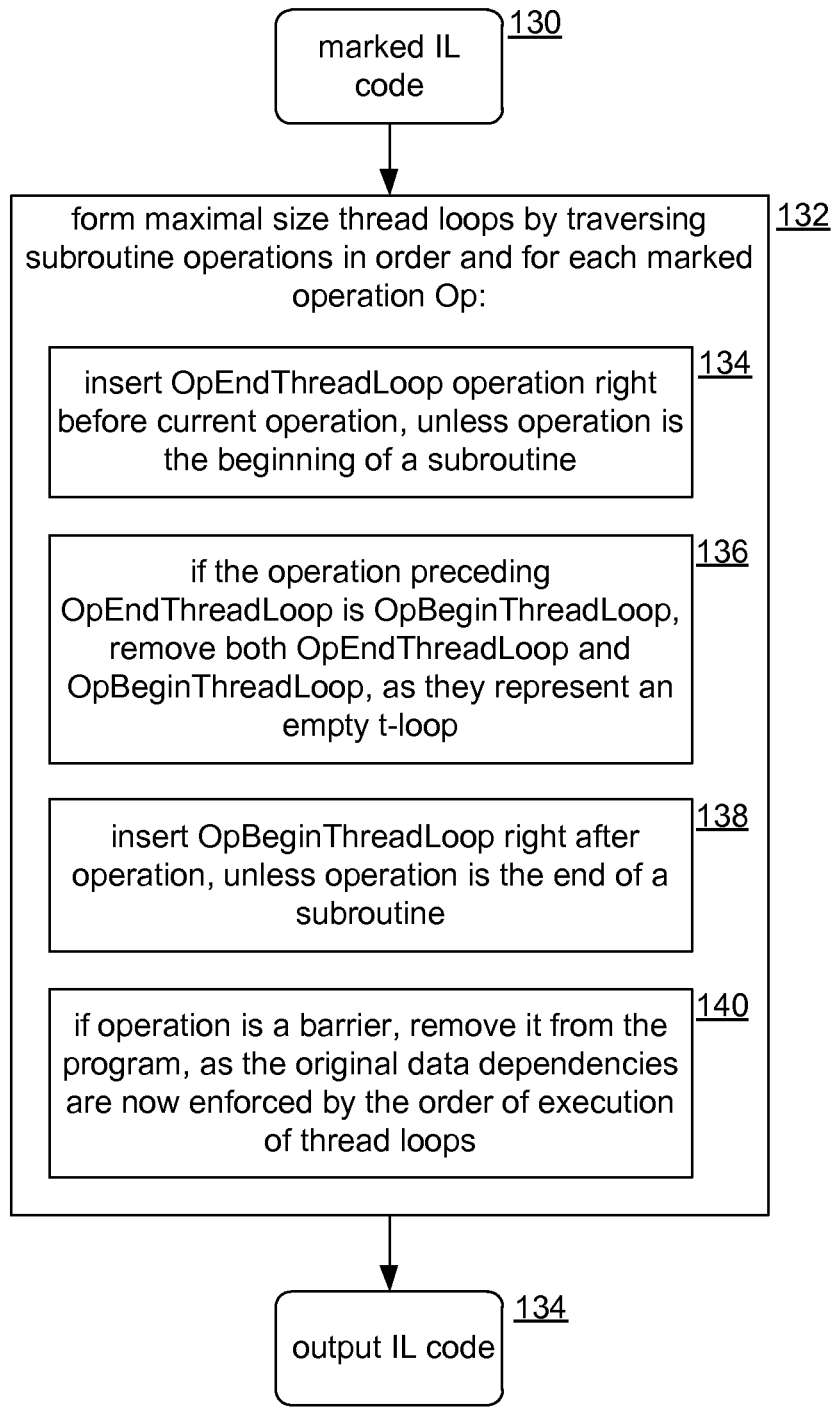
FIG. 3 shows a step for forming maximal size thread loops from marked IL code.

FIG. 3 shows a step 132 for forming maximal size thread loops from the marked IL code 130. Step 132 involves traversing subroutine operations in order and for each marked operation (Op) performing any of the relevant steps 134, 136, 138, 140. At step 134, unless the operation currently being processed is the beginning of a subroutine, an OpEndThreadLoop operation is inserted right before the current operation. At step 136, it is determined if the operation preceding an OpEndThreadLoop is an OpBeginThreadLoop, and if so, both the OpEndThreadLoop and the OpBeginThreadLoop are removed as they represent an empty t-loop. To elaborate, it may happen that two marked operations follow each other. Then, the code would have been something like:

```
OpBeginThreadLoop
...
OpEndThreadLoop
Op1
OpBeginThreadLoop // empty t-loop to
OpEndThreadLoop // be removed
Op2
OpBeginThreadLoop
...
OpEndThreadLoop
```

Therefore, there is an empty t-loop that may still be in the code, but it does nothing and can be removed.

At step 138, unless the current operation is the end of the subroutine, an OpBeginThreadLoop operation is inserted right after the current operation. Finally, at step 140, if the current operation is a barrier or analogous type of synchronization operation, the operation is removed because the original data dependencies are now enforced by the order of the execution of the thread loops.

Note that the partitioning algorithm 110 creates maximal size t-loops without breaking the scoping structure and inserted t-loops are properly nested. There are, however, control-flow transfer operations such as break, continue and return that may transfer control outside of a t-loop. These may need to be specially treated to preserve correctness of the shader program. If these operations do not transfer control outside of a t-loop (i.e., they are nested within their corresponding scopes), they are handled in a standard way.

Regarding the term "maximal", this term means that it is not possible to increase the amount of code encompassed by a t-loop without breaking the nested structure of the program. A minimal size t-loop (or region) would encompass a single operation—also a possible partitioning, but the program will be slow due to t-loop overheads. Maximal size t-loops reduce the overall number of t-loops and thus reduce the associated overhead.

Figure 4:
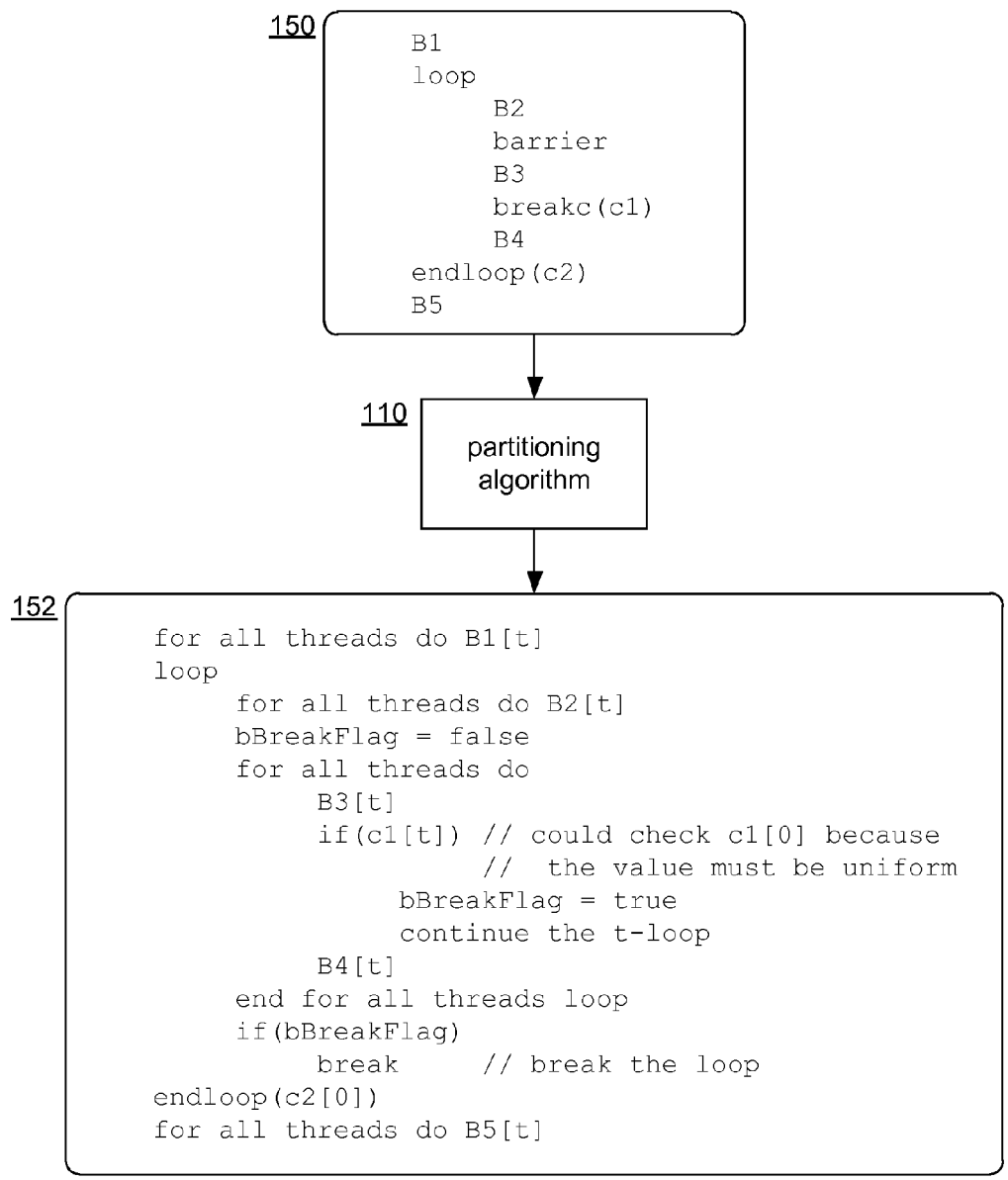
FIG. 4 shows an example input where a loop conditional break is nested in a thread loop.

FIG. 4 shows an example input 150 where a loop conditional break is nested in a t-loop. The input 150 is transformed as shown in output 152.

Four helper flag variables are used, one for each for four different types of control transfer (break, continue, switch break, and return). Each such variable is a scalar because the value of the transfer conditional is uniform. The variables are initialized to false before a t-loop if they are used in the t-loop. A loop break/continue, nested in a uniform t-loop, will set the bBreakFlag/bContinueFlag to true and transfer control to the next iteration of the enclosing t-loop and, after the t-loop is complete, break/continue the corresponding loop if the bBreakFlag/bContinueFlag is set. An executed uniform switch break, nested in a uniform t-loop, sets the bSwitchBreakFlag to true and transfers control to the next iteration of the enclosing t-loop and, after the t-loop is done, breaks the switch if bSwitchBreakFlag is set. Finally, uniform return, nested in a uniform t-loop, sets the bReturnFlag to true and transfers control to the next iteration of the enclosing t-loop and, after the t-loop is done, returns from the subroutine if the bReturnFlag is set.

Divergent Transfer of Control Outside of T-Loop

Figure 5:
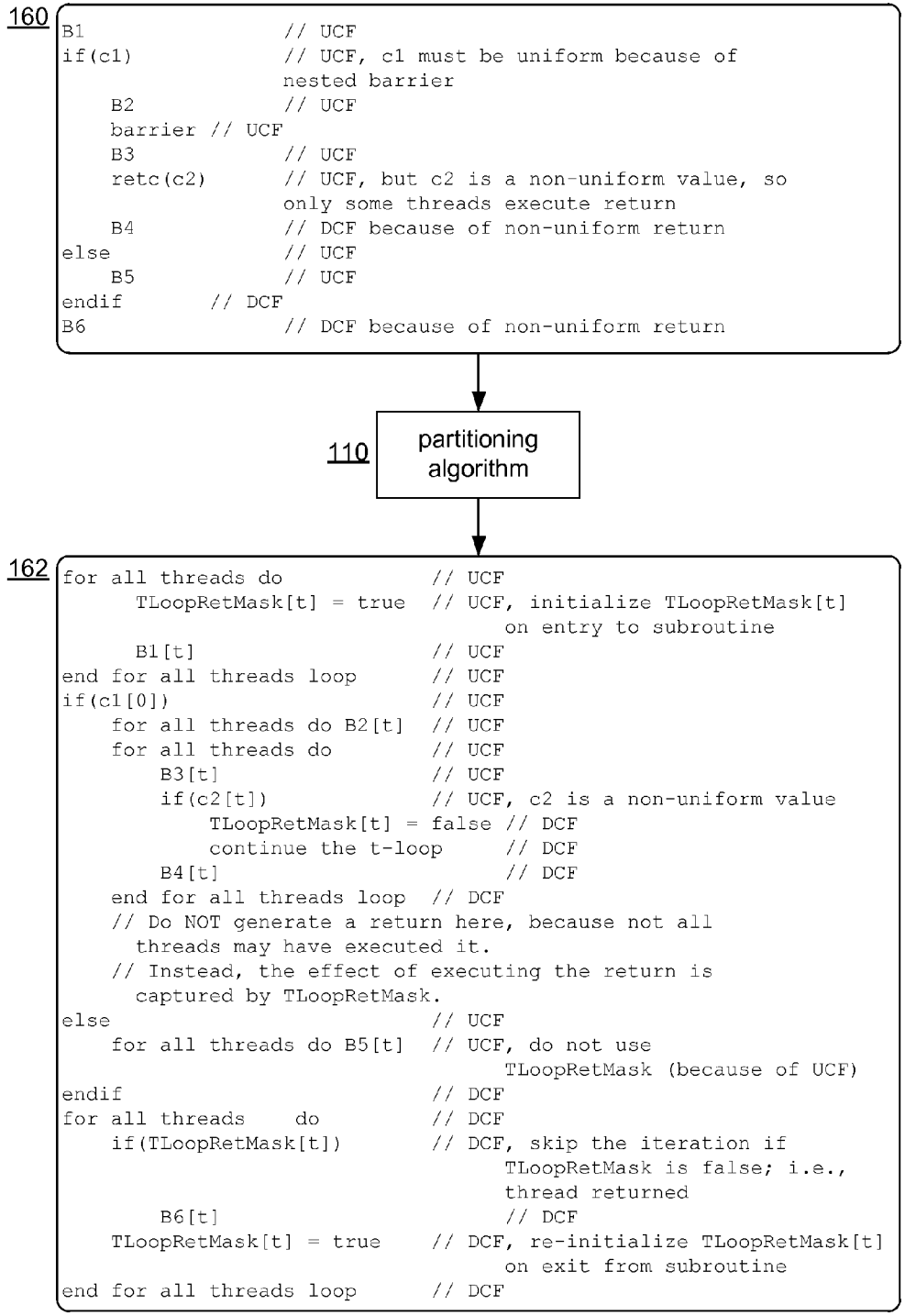
FIG. 5 shows an example of a return causing divergent control flow (DCF).

It may happen that a transfer outside of a t-loop is divergent (non-uniform). FIG. 5 shows an example of such a return causing divergent control flow (DCF). DCF input 160 is transformed as shown in output 162. The transformation introduces a t-loop mask TLoopRetMask, one instance per thread, to capture which threads executed a divergent return. If a subroutine contains such a return, the rules for the insertion of TLoopRetMask are as follows:

(1) Initialize TLoopRetMask to true on entry to the subroutine at the very beginning of the entry t-loop. If there is no entry t-loop, generate one.

(2) Set TLoopRetMask to false for every DCF return as well as UCF return that transfers control outside of a t-loop if there is at least one DCF return that transfers control outside of this t-loop.

(3) For every t-loop that starts in DCF, generate guarding code at the very beginning of a t-loop that would skip the iteration if TLoopRetMask is false.

(4) Re-initialize TLoopRetMask to true on exit from the subroutine at the very end of the exit t-loop, unless it is the main subroutine. If there is no exit t-loop, generate one.

It is sufficient to use only one TLoopRetMask per program, even though it may be required in several subroutines. While this reduces overhead, it is also the reason for re-initialization of the mask on exit from the subroutine. Using more mask variables, which are replicated across threads, increases memory footprint and is not desirable.

A loop's break and continue that transfer control outside of a t-loop cannot be in DCF. If the break or continue did so transfer control, the entire loop wouldn't have been in DCF (due to the back edge) and cannot execute any barrier. And, because the t-loops are induced by barriers such a loop must be nested inside a t-loop according to our partitioning algorithm.

A DCF switch-break that transfers control outside of a t-loop can be handled in exactly the same manner as the DCF return, via managing the state of TLoopSwitchMask. To avoid using several such variables and complicated code generation, TLoopSwitchMask may be initialized to True right before such a switch and TLoopSwitchMask may be re-initialized to True right after the switch. This approach correctly transforms nested switches. Suppose switch S2 is nested in a case of switch S1. If S2 requires TLoopSwitchMask, S2 contains a nested barrier (otherwise, it would have been nested in a t-loop), so both S1 and S2 must start in UCF. Furthermore, the control is uniform in S1's case at least up until the beginning of S2 (otherwise, S2 would have been in DCF), thus TLoopSwitchMask must be true before the start of S2. Since the effect of the DCF switch break in S2 propagates only to the end of S2 and has no effect on control-flow type in S1, it is safe to re-initialize TLoopSwitchMask right after S2 because TLoopSwitchMask has not yet captured any effect of S1's DCF break (although it was used inside S2). What may be done here is to insert extra re-initializations of TLoopRetMask and TLoopSwitchMask to essentially avoid complicated analysis of where exactly to insert mask initializations for the situation that would occur rarely in performant compute shaders. Finally, the guarding condition for t-loops that are nested in a switch and start in DCF must be set to "TLoopRetMask && TLoopSwitchMask" to account for effects of both DCF return and switch break.

Execution of T-Loops on CPUs

To achieve high performance, it may be helpful to minimize overhead of synchronization by having fairly coarse units of work and by load-balancing the processors. A typical invocation of a compute shader dispatch call creates many instances of the compute shader program, each of which usually performs roughly similar amounts of work. Thus, it is natural to use a single CPU thread to execute an instance: units of work are coarse, the concurrency overhead of executing t-loops does not exist due to serial execution, and the load-balance is reasonable.

Some compute shaders, though, are written to "stream" units of work rather than rely on the Dispatch call to do the streaming; i.e., the Dispatch call instantiates just a few instances of the compute shader program, and each instance has a streaming loop that processes several units of work, one after another. In this scenario, the load-balance may suffer due to under-utilization of some CPU threads. To avoid this, several CPU threads can be used to run each thread loop, which is legal because t-loop iterations are independent. These threads must synchronize before and after each t-loop and use atomic increment to obtain the thread index t of a t-loop iteration. The result is better load-balancing at the expense of small synchronization overhead. Note that Dispatch (and its equivalents in various shader languages) may be able to not only invoke shader language code for execution, but a Dispatch or Draw call may also reference various graphical objects in the shader language, such as pixels, vertices, etc. Additional details of Dispatch (and its equivalents) and thread blocks, are available elsewhere (see, e.g., "Practical Rendering and Computation with Direct3D 11", Zink et al., 2011, CRC Press).

Optimizing Dispatch

Usually, the Dispatch call (or its equivalent) creates hundreds or thousands of compute shader instances. When run on a CPU rather than a GPU, executing all of the instances concurrently will (1) create too many threads, (2) use too much memory, (3) cause many expensive context switches, and (4) pollute the cache due to frequent context switches. This results in poor performance due to overbooking of the system. Thus it may be helpful to limit the number of compute shader instances that execute concurrently, for example, the number of compute shader instances may be limited to two plus the number of CPU cores.

CONCLUSION

Figure 6:
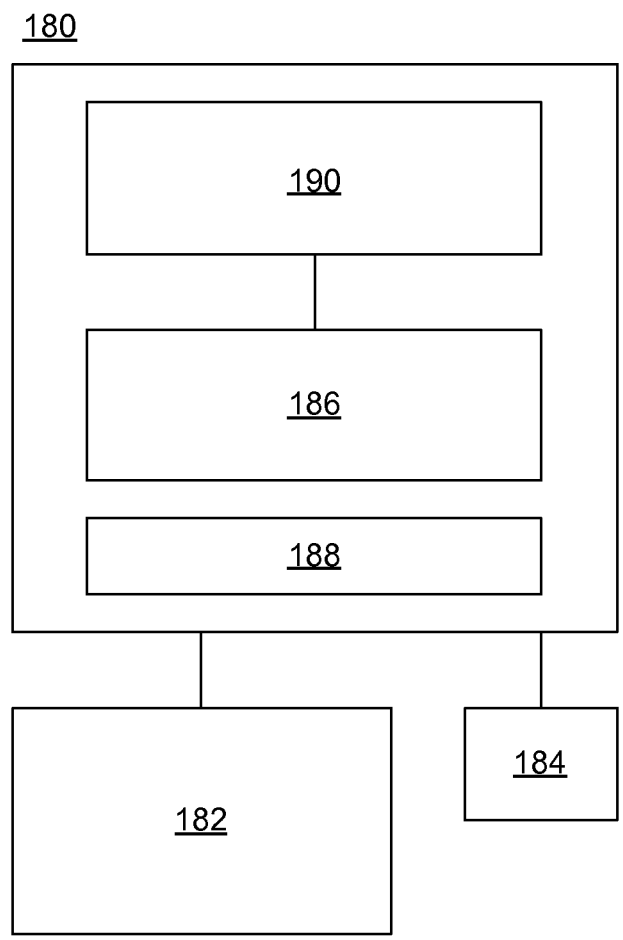
FIG. 6 shows a computing device.

FIG. 6 shows a computing device 180. The computing device 180 is an example of a type of device that can perform embodiments described above. The computing device 180 may have some or all of the following: a display 182, an input device 184 (e.g., keyboard, mouse touch sensitive area, etc.), a CPU 186, a GPU 188, and storage media 190. These components may cooperate in ways well known in the art of computing.

Embodiments and features discussed above can be realized in the form of information stored in volatile or non-volatile computer or device readable storage media. This is deemed to include at least physical storage media such as optical storage (e.g., compact-disk read-only memory (CD-ROM)), magnetic media, flash read-only memory (ROM), or any means of physically storing digital information (excluding carrier waves, signals per se, and the like). The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The term media as used herein refers to physical devices and material and does not refer to signals per se, carrier waves, or any other transient forms of energy per se. The embodiments and features can be performed on any type of computing device, including portable devices, workstations, servers, mobile wireless devices, and so on.

The invention claimed is:

1. A method of transforming intermediate representation (IR) code compiled from a compute shader comprised of source code in a shading language, the method performed by a computing device comprising processing hardware coupled with storage hardware storing the IR code, the method performed by the processing hardware, the method comprising:
performing a marking and analysis pass that includes:
determining that first places in the IR code are the beginnings and ends of subroutines in the IR code, marking the determined first places in the IR code on the basis of their having been determined to be places in the IR code that are the beginnings and ends of subroutines,
determining that second places in the IR code are barriers nested in the subroutines and marking the determined second places on the basis of their having been determined to be places in the IR code that are barriers nested in the subroutines,
for each of the barriers, identifying and marking nested scopes and related operations, and
determining that third places in the IR code are call sites of the subroutines determined to execute a barrier either directly or indirectly via a call chain, and marking the third places on the basis of their having been determined to be places in the IR code that are call sites of subroutines determined to directly or indirectly execute a barrier; and
using the marked IR code to form maximal-size thread loops by processing operations of the subroutine marked by the marking, the processing comprising evaluating the marked operations in order, the evaluating comprising, for a current operation:
inserting an end-thread-loop operation immediately before the current operation, unless the current operation is marked as the beginning of a subroutine,
when the current operation is an end-thread-loop operation that is immediately preceded by a begin-thread-loop operation, removing both such operations,
inserting a begin-thread-loop operation immediately after the current operation, unless current operation is the end of a subroutine, and
when the current operation is a barrier, removing it from the IR code.

2. A method according to claim 1, further comprising determining that a current operation being processed is not the beginning of a subroutine, and in response inserting an end-thread-loop operation before the current operation being processed.

3. A method according to claim 2, wherein removing the end-thread-loop operation and a corresponding begin-thread-loop operation when the begin-thread-loop operation immediately precedes the end-thread-loop-operation.

4. A method according to claim 1, further comprising determining that a current operation being processed is not the end of a subroutine, and in response inserting a begin-thread-loop operation directly after the current operation being processed.

5. A method according to claim 1, further comprising determining that a current operation being processed is a barrier operation, and in response removing the barrier operation from the IR code.

6. A method according to claim 1, further comprising outputting updated IR code wherein barrier operations in the IR code that correspond to barrier statements in the source code are removed from the IR code and thread loops are added to the IR code.

7. A method according to claim 6, wherein the transformed IR code with the barriers removed is compiled and executed on a CPU that is not a GPU, and wherein a thread-loop is executed by a plurality of CPU threads.

8. Storage hardware storing information to enable a computing device to perform a process, the process comprising:
executing, by processing hardware of the computing device, a compiler algorithm invoked when the compiler receives code corresponding to a shader program stored in the storage hardware, the shader program performing non-graphics computation and comprising shader language code; and
partitioning, by the algorithm being executed by the processing hardware, the code of the shader program into maximal-size thread loops and removing synchronization barriers from the code, wherein the partitioning is performed according to a maximal number of thread blocks allowed to execute concurrently, wherein the removing the synchronization barriers is performed by:

performing a marking phase by detecting and marking barriers, wherein places in the code that are to be marked for partitioning comprise first operations comprising respective beginnings and ends of subroutines determined to potentially directly or indirectly execute a barrier, and second operations that define all scopes nesting a callee determined to potentially execute a corresponding detected barrier;

forming the maximal-size thread loops by evaluating the marked operations in order, the evaluating comprising, for a current operation:
  inserting an end-thread-loop operation immediately before the current operation, unless the current operation is marked as the beginning of a subroutine,
  when the current operation is an end-thread-loop operation that is immediately preceded by a begin-thread-loop operation, removing both such operations,
  inserting a begin-thread-loop operation immediately after the current operation, unless current operation is the end of a subroutine, and
  when the current operation is a barrier, removing it from the IR code; and
storing the modified IR code in the storage hardware.

9. Storage hardware according to claim 8, wherein the partitioning is performed such that data dependencies in the shader program that would have been enforced by the synchronization barriers are preserved despite the removal of the synchronization barriers.

10. Storage hardware according to claim 9, wherein the partitioning preserves nesting of at least subroutines or control flow constructs in the code.

11. Storage hardware according to claim 9, wherein the code is compiled for execution on a CPU that is not a GPU, and a thread loop is executed by one or more CPU threads.

12. Storage hardware according to claim 8, the process further comprising optimizing uniform control flow transfers in the code to maximize sizes of the thread loops respectively.

13. Storage hardware according to claim 8, the process further comprising determining whether to use a single or multiple CPU threads to execute a thread loop.

14. Storage hardware according to claim 8, wherein the number is determined according to a number of cores of a CPU that is executing the code.

* * * * *